(12) United States Patent
Canitano et al.

(10) Patent No.: US 10,408,175 B2
(45) Date of Patent: Sep. 10, 2019

(54) SYSTEM FOR HOUSING A FUEL PUMP AND A FUEL FILTER

(71) Applicant: VMP Tuning Inc., New Smyrna, FL (US)

(72) Inventors: Marcello Canitano, Melbourne, FL (US); Carl Lazzeri, Melbourne, FL (US)

(73) Assignee: VMP Tuning, Inc., New Smyrna, FL (US)

( * ) Notice: Subject to any disclaimer, the term of this patent is extended or adjusted under 35 U.S.C. 154(b) by 71 days.

(21) Appl. No.: 15/638,470

(22) Filed: Jun. 30, 2017

(65) Prior Publication Data

US 2019/0003433 A1    Jan. 3, 2019

(51) Int. Cl.
| | |
|---|---|
| *F02M 37/10* | (2006.01) |
| *F02M 37/00* | (2006.01) |
| *B01D 35/027* | (2006.01) |
| *B60K 15/077* | (2006.01) |
| *F02M 37/08* | (2006.01) |
| *F02M 37/44* | (2019.01) |

(52) U.S. Cl.
CPC ......... *F02M 37/103* (2013.01); *B01D 35/027* (2013.01); *B60K 15/077* (2013.01); *F02M 37/0094* (2013.01); *F02M 37/44* (2019.01); *F02M 2037/082* (2013.01)

(58) Field of Classification Search
CPC ........... F02M 2037/225; F02M 37/103; F02M 37/0094; F02M 37/44; F02M 2037/082; B01D 35/027; B60K 15/077

USPC ....................................................... 123/509
See application file for complete search history.

(56) References Cited

U.S. PATENT DOCUMENTS

| | | |
|---|---|---|
| 5,080,077 A | 1/1992 | Sawert et al. |
| 5,330,475 A | 7/1994 | Woodward et al. |
| 5,649,514 A | 7/1997 | Okada et al. |
| 6,155,238 A | 12/2000 | Briggs et al. |
| 6,159,383 A | 12/2000 | Gullett et al. |
| 6,213,726 B1 | 4/2001 | Tuckey |
| 6,358,022 B1 * | 3/2002 | Frank ................ B01D 35/027 |
| | | 417/423.9 |
| 6,505,644 B2 | 1/2003 | Coha et al. |
| 6,553,973 B1 | 4/2003 | Coha et al. |
| 6,619,271 B2 | 9/2003 | Iwamoto et al. |
| 6,718,948 B2 | 4/2004 | Vahle et al. |

(Continued)

*Primary Examiner* — Mahmoud Gimie
*Assistant Examiner* — Joshua Campbell
(74) *Attorney, Agent, or Firm* — Kelly G. Swartz; Widerman Malek, PL

(57) ABSTRACT

A system for housing a fuel pump and a fuel filter including a stem body having a first surface and an opposing second surface. A first, third, and fifth orifice may be located in the first surface. A second, fourth and sixth orifice may be located in the second surface. The second orifice may carry the fuel filter, and be in fluid communication with the first orifice. The fourth orifice may interface with an inlet to the fuel pump, and be in fluid communication with the third orifice. The sixth orifice may be in fluid communication with the fifth orifice. A first channel may be adapted to place the first orifice in fluid communication with the third orifice. A second channel may be adapted to place the fifth orifice, located at a first end of the second channel, in fluid communication with a second end of the second channel.

20 Claims, 17 Drawing Sheets

(56) References Cited

U.S. PATENT DOCUMENTS

| | | |
|---|---|---|
| 6,871,640 B2 | 3/2005 | Atwood et al. |
| 6,923,208 B2 | 8/2005 | Okabe et al. |
| 6,928,989 B2 | 8/2005 | Powell |
| 6,981,490 B2 | 1/2006 | Nagata et al. |
| 7,069,913 B1 | 7/2006 | Crary |
| 7,069,914 B2 | 7/2006 | Nagata |
| 7,082,931 B2 | 8/2006 | Sinz |
| 7,117,856 B2 | 10/2006 | Honda et al. |
| 7,234,451 B2 | 6/2007 | Betz et al. |
| 7,237,538 B2 | 7/2007 | Perruchot et al. |
| 7,506,636 B2 | 3/2009 | Lubinski et al. |
| 7,556,024 B2 | 7/2009 | Crary et al. |
| 7,571,716 B2 | 8/2009 | Tipton et al. |
| 7,757,672 B2 | 7/2010 | Villaire et al. |
| 8,230,841 B2 | 7/2012 | Okada et al. |
| 8,240,332 B1 | 8/2012 | Matusek et al. |
| 8,297,260 B2 | 10/2012 | Masuda |
| 8,739,821 B2 | 6/2014 | Murabayashi et al. |
| 8,820,350 B2 | 9/2014 | Kim et al. |
| 8,857,414 B2 | 10/2014 | Takata |
| 8,915,233 B2 | 12/2014 | Mitsudou et al. |
| 9,109,554 B2 | 8/2015 | Yoon et al. |
| 9,151,257 B2 | 10/2015 | Jeon et al. |
| 9,261,059 B2 | 2/2016 | Schoenfuss et al. |
| 9,394,866 B2 | 7/2016 | Fisher et al. |
| 9,416,759 B2 | 8/2016 | Braun et al. |
| 9,429,118 B2 | 8/2016 | Oohashi |
| 9,470,192 B2 | 10/2016 | Honda |
| 9,567,956 B2 | 2/2017 | Oohashi |
| 2003/0131828 A1 | 7/2003 | Crary |
| 2003/0136507 A1 | 7/2003 | Thiel et al. |
| 2006/0070941 A1 | 4/2006 | Cline et al. |
| 2009/0000844 A1 | 1/2009 | Castille et al. |
| 2013/0276531 A1 | 10/2013 | Benner et al. |
| 2013/0284290 A1 | 10/2013 | Basista et al. |
| 2014/0116398 A1 | 5/2014 | Jeon et al. |
| 2015/0224873 A1 | 8/2015 | Ishitoya et al. |
| 2015/0361936 A1 | 12/2015 | Honda |
| 2016/0089972 A1 | 3/2016 | Hsu et al. |
| 2016/0252058 A1 | 9/2016 | Park et al. |
| 2016/0305381 A1 | 10/2016 | Byrski et al. |

\* cited by examiner

SYSTEM FOR HOUSING A FUEL PUMP AND A FUEL FILTER

FIELD OF THE INVENTION

The present invention relates to systems for housing engine fuel pumps and fuel filters. Specifically, the present invention is directed to a system housing a fuel pump and fuel filter and interfacing with a saddle fuel tank and a primary fuel tank to supply adequate fuel to an engine when under peak load.

BACKGROUND

An increasing trend in the automobile industry is to provide modules that are a preassembly of multiple components for installation into a vehicle assembly or subassembly as a unit. To this end, in-tank fuel modules have become increasingly more prevalent in vehicles. The fuel modules may include a fuel pump, a fuel filter and other devices in a typically complicated single unit.

Prior art in-tank fuel modules provide modularity while greatly sacrificing the ability to change out failed components within the module. For example, a fuel module housing may include one or more portions that are permanently secured to one another encapsulating components that may need to be changed during the service life of the vehicle. Thus, a failed fuel pump or filter must require replacement of the entire fuel module at a great cost to the vehicle manufacturer or vehicle owner. Therefore, what is needed is an improved in-tank fuel module providing an assembly having the fuel pump and filter while providing the ability to disassemble the fuel module to the degree necessary to change out a failed component.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for housing a fuel pump and a fuel filter including a stem body having a first surface and an opposing second surface. The stem body may include at least six orifices.

A first orifice may be located in the first surface. A second orifice may be located in the second surface, adapted to carry the fuel filter, and in fluid communication with the first orifice through a first passageway, which extends through the stem body. A bottom wall of the second orifice may be adapted to carry the fuel filter.

A third orifice may be located in the first surface. A fourth orifice may be located in the second surface, adapted to interface with an inlet to the fuel pump, and in fluid communication with the third orifice through a second passageway, which extends through the stem body. A bottom wall of the fourth orifice may be adapted to receive an inlet to the fuel pump. A first channel may be positioned on the first surface and adapted to place the first orifice in fluid communication with the third orifice.

A fifth orifice may be located in the first surface. A sixth orifice may be located in the second surface and in fluid communication with the fifth orifice through a third passageway, which extends through the stem body. A second channel may be positioned on the first surface and adapted to place the fifth orifice, located at a first end of the second channel, in fluid communication with a second end of the second channel.

A seventh orifice may be located in the first surface. An eighth orifice may be located in the second surface and connected to the seventh orifice through a fourth passageway, which may extend through the stem body. The eighth orifice may be adapted to be in fluid communication with a regulator outlet. A ninth orifice may be located in the first surface. A tenth orifice may be located in the second surface and connected to the ninth orifice through a fifth passageway, which extends through the stem body. The tenth orifice may be adapted to provide access to a regulator spring adjusting screw. An eleventh orifice may be located in the second surface.

A twelfth orifice may be located in a front surface of the stem body in fluid communication with the eleventh orifice through a sixth passageway, which may extend through the stem body. A thirteenth orifice may be located within a wall defining the second orifice. A fourteenth orifice may be located in the second surface of the stem body in fluid communication with the thirteenth orifice through a seventh passageway, which extends through the stem body.

The system may also include a hat adapted to be secured to the first surface. A first threaded hat orifice may be adapted to align with the second end of the second channel. A second hat orifice may be adapted to align with the seventh orifice of the stem body. A protrusion may be located on a periphery of the hat. A third hat orifice may be adapted to align with the ninth orifice of the stem body.

The system may also include a regulator collar having a first side and an opposing second side. The regulator collar may be adapted to secure to the second surface of the stem body. A first collar orifice may be located on the first side of the regulator collar. A second collar orifice may be located on the second side of the regulator collar and connected to the first collar orifice by a first collar passageway adapted to carry a regulator and centered on the eighth orifice of the stem body. A third collar orifice may be located on the first side of the regulator collar. A fourth collar orifice may be located on the second side of the regulator collar, connected to the third collar orifice by a second collar passageway, and adapted to align with the sixth orifice of the stem body. A fifth collar orifice may be located on the first side of the regulator collar. A sixth collar orifice may be located on the second side of the regulator collar, connected to the fifth collar orifice by a third collar passageway, and adapted to align with the fourteenth orifice of the stem body.

A first collar channel may be located on the first side of the regulator and extend from the first collar orifice to the third collar orifice. A second collar channel may be located on the first side of the regulator and extend from the first collar orifice to the fifth collar orifice. The system may include a regulator bottom cap adapted to secure to the second side of the regulator collar.

The regulator bottom cap may include a first cover adapted to cover an entirety of the third collar orifice and the first collar channel, a second cover adapted to cover an entirety of the fifth collar orifice and the second collar channel, and a protuberance adapted to enter the first collar orifice. The system may include a fuel filter cap having a threaded end adapted to mate with threads located on a wall defining the second orifice of the stem body. The fuel filter cap may have a closed end opposing the threaded end and be adapted to carry a fuel filter.

The system may include a saddle drop nipple having a threaded end adapted to mate with threads located on a wall defining the eleventh orifice of the stem body and an opposing open end adapted to deliver excess fuel to a saddle tank. The system may include a saddle siphon nipple having a threaded end adapted to mate with threads located on a wall defining the twelfth orifice of the stem body and an opposing open end adapted to receive fuel from a saddle tank.

DETAILED DESCRIPTION OF THE INVENTION

Figure 1:
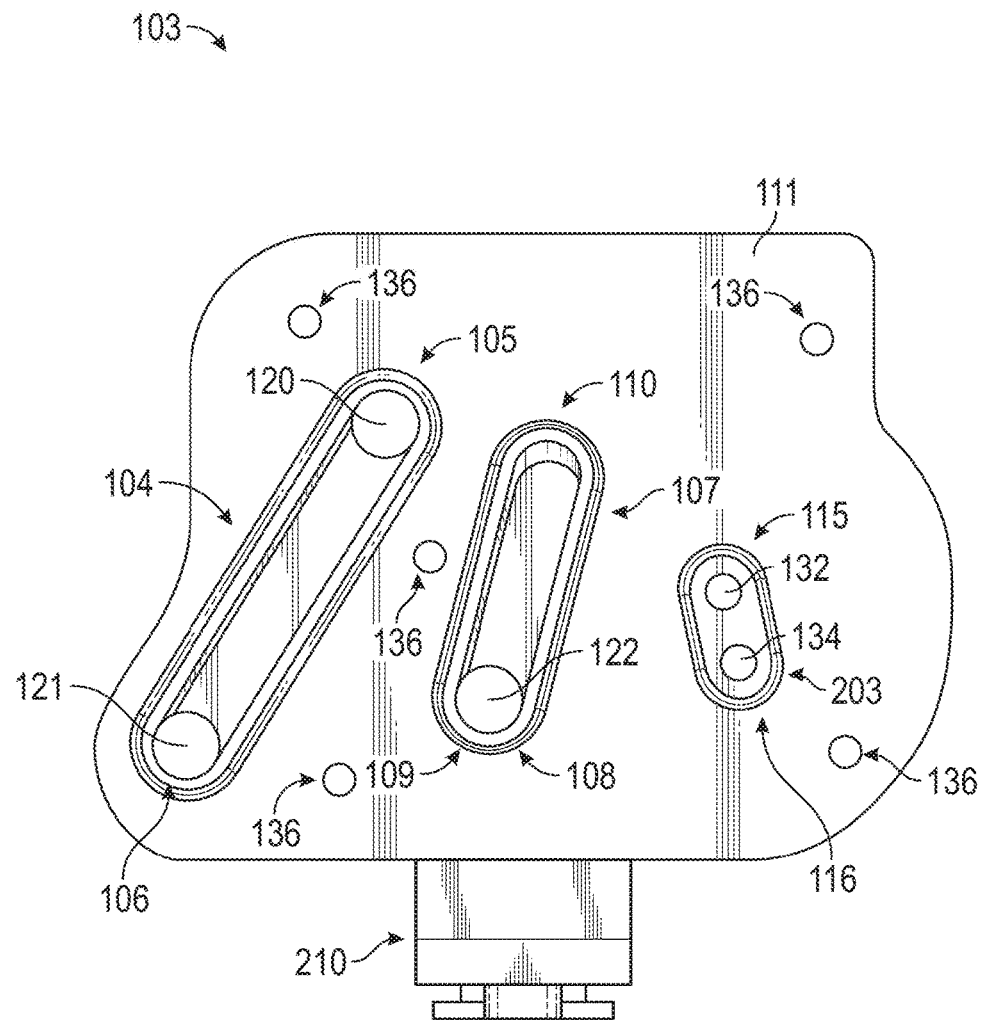
FIG. 1 is a top plan view of a stem body for a system for housing a fuel pump and a fuel filter according to an embodiment of the present invention.
Figure 2:
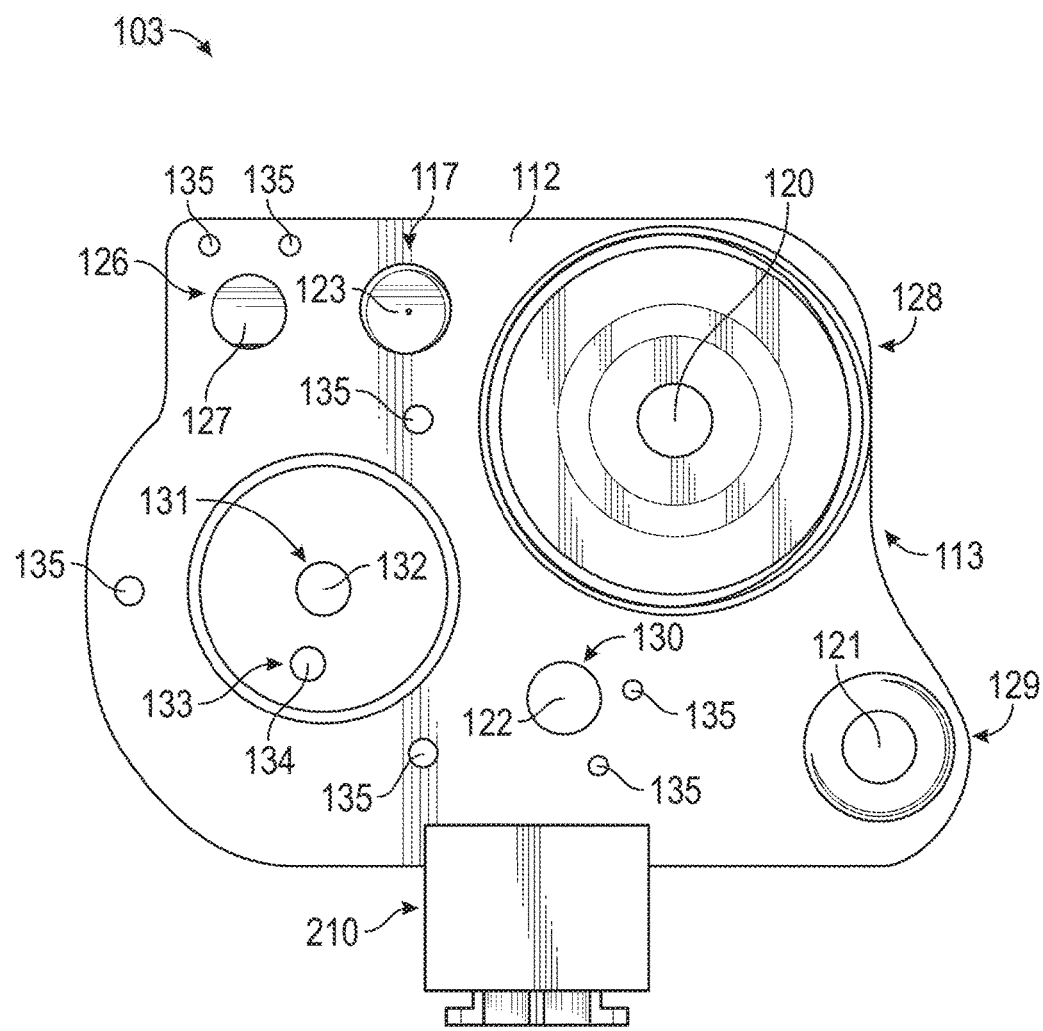
FIG. 2 is a bottom plan view of the stem body of FIG. 1.
Figure 3:
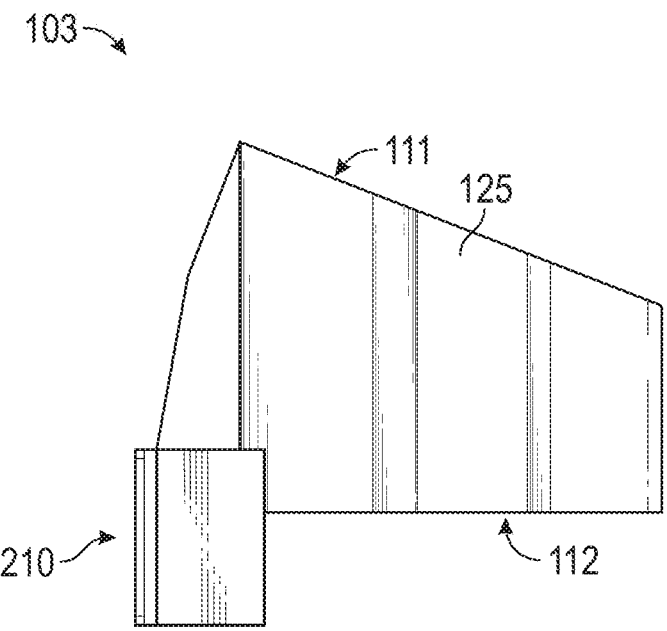
FIG. 3 is a left side elevation view of the stem body of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for housing a fuel pump and a fuel filter 100. The system may include a stem body 103, a hat 140, a regulator collar 150, a regulator bottom cap 170, a fuel filter cap 180, a saddle drop nipple 190, and a saddle syphon nipple 200.

Figure 4:
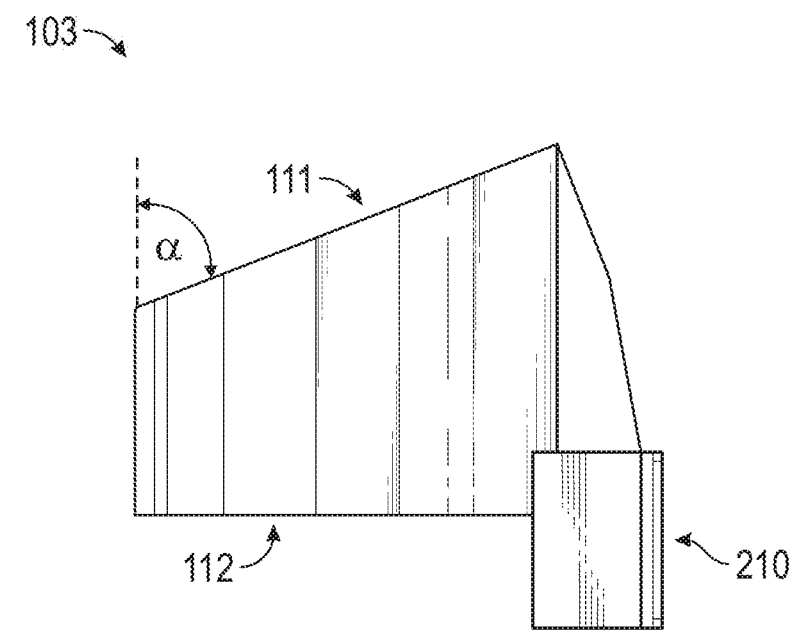
FIG. 4 is a right side elevation view of the stem body of FIG. 1.
Figure 5:
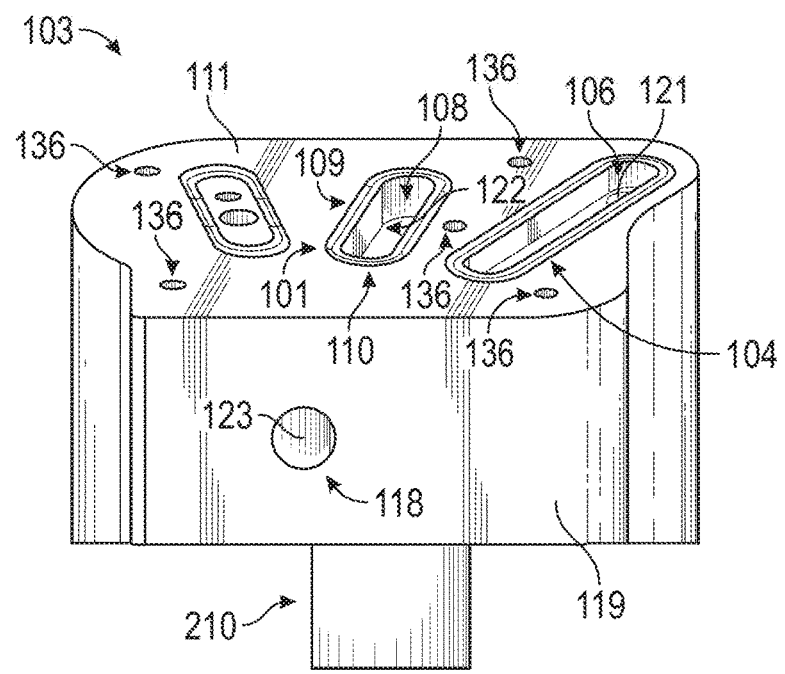
FIG. 5 is a front perspective view of the stem body of FIG. 1.
Figure 6:
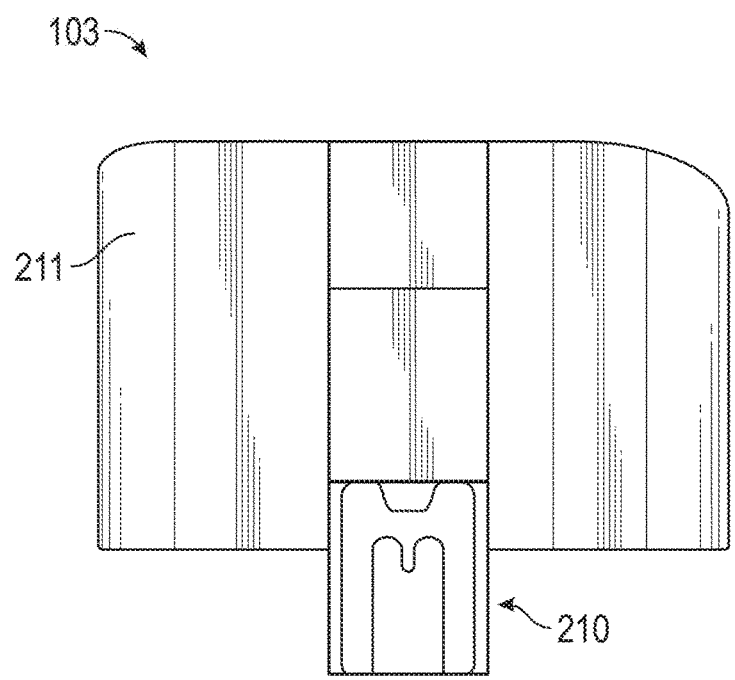
FIG. 6 is a rear elevation view of the stem body of FIG. 1.
Figure 7:
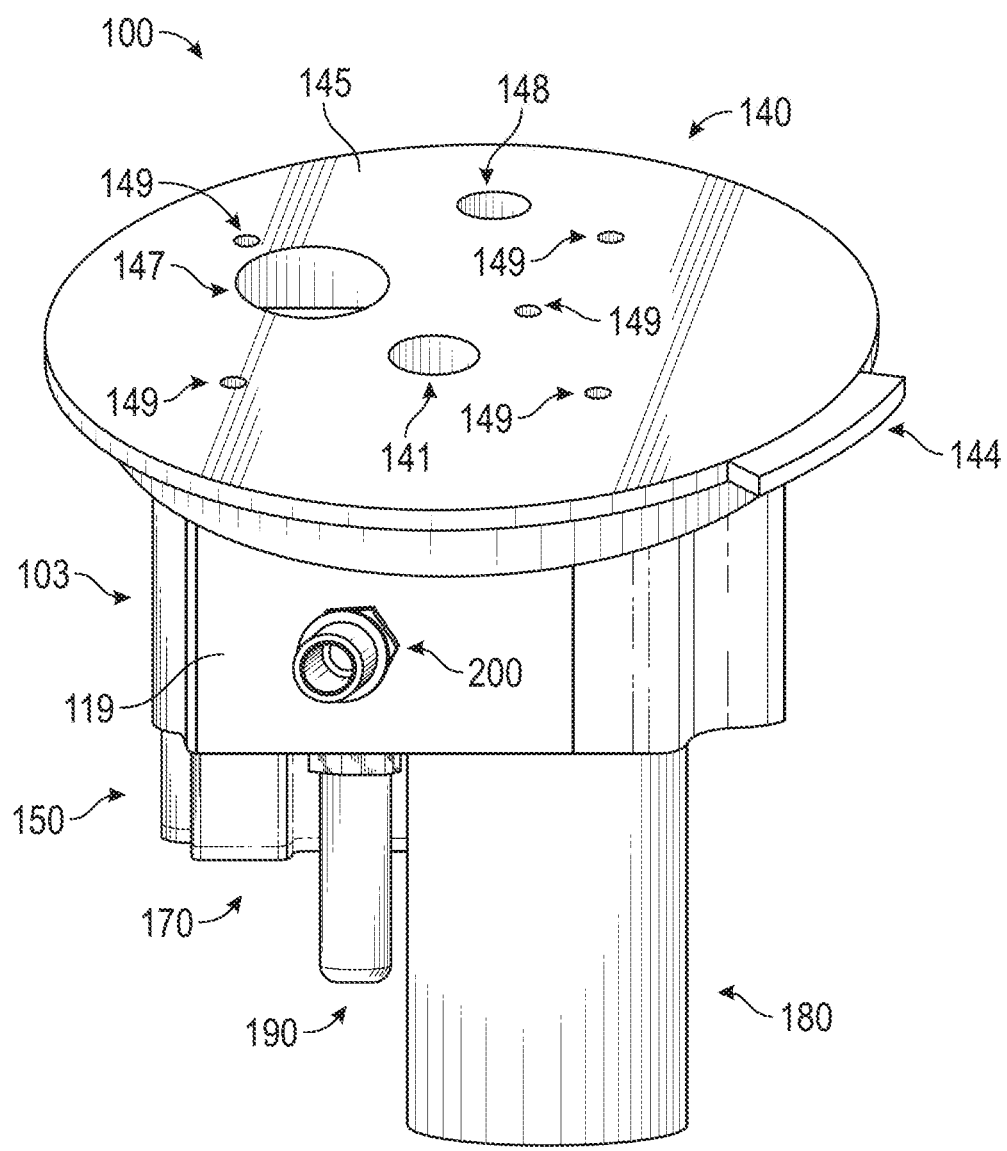
FIG. 7 is a front perspective view of the system for housing a fuel pump and a fuel filter according to an embodiment of the present invention.
Figure 8:
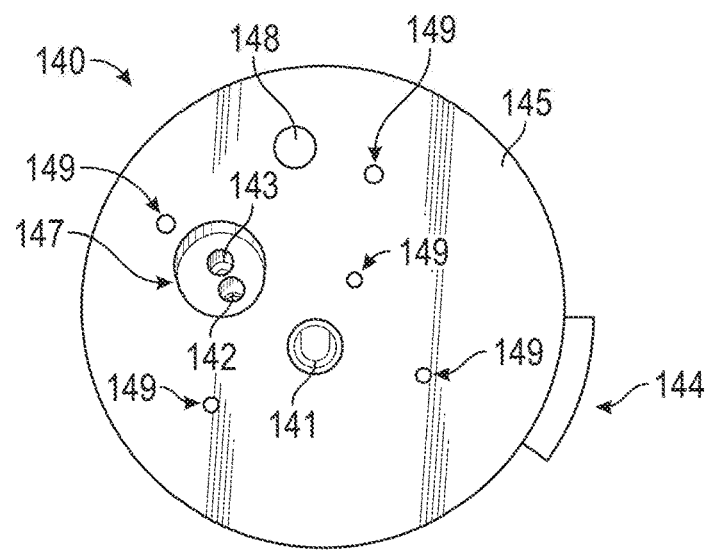
FIG. 8 is a top plan view of a hat for a system for housing a fuel pump and a fuel filter according to an embodiment of the present invention.
Figure 9:
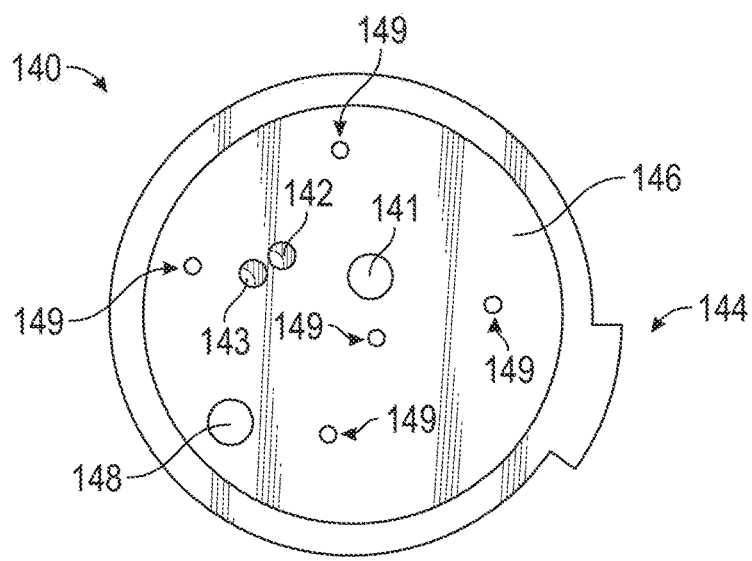
FIG. 9 is a bottom plan view of the hat of FIG. 8.

The stem body 103 may have two opposing surfaces. The first surface 111 may be generally upward facing when the stem body 103 is positioned within an engine compartment. The second surface 112 may be generally downward facing when the stem body 103 is positioned within the engine compartment. The first surface 111 and second surface 112 may not be parallel to one another. As depicted in FIG. 4, the first surface 111 may extend at an angle α with respect to a plane perpendicular to the second surface 112. The angle α may be less than 90°. In one embodiment a may be 69°. In one embodiment, the angle α may be in a range of 68-70°. The angle α may be chosen to match the angle of an original equipment manufacturer tank in the engine in which the system 100 is installed, allowing for a factory-style fit while keeping the fuel pump perpendicular to the tank bottom when installed. Such a configuration provides maximum fuel flow even at low fuel levels. The first surface 111 and second surface 112 may be said to oppose each other even though they are not parallel to one another. A front surface 119, left side surface, right side surface, and back surface may extend between the first surface 111 and the second surface 112.

There may be a number of orifices located in the stem body 103. A first orifice 105, third orifice 106, fifth orifice 108, seventh orifice 115, ninth orifice 116 may be located in the first surface 111. A second orifice 128, fourth orifice 129, sixth orifice 130, eighth orifice 131, tenth orifice 133, eleventh orifice 117, thirteenth orifice 124, and fourteenth orifice 126 may be located in the second surface 112. A twelfth orifice 118 may be located on a front surface 119. All orifices may have geometric perimeters. In one embodiment, the geometric perimeters may be circular, ovular, oblong, or any combination of like shapes.

The first orifice 105 may be located within a first channel 104 positioned on the first surface 111. At least a portion of the perimeter of the first orifice 105 may be within the recess of the first channel 104. The first orifice 105 may be located at a first end or a first side of the first channel 104.

The third orifice 106 may be located within the first channel 104. At least a portion of the perimeter of the third orifice 106 may be within the recess of the first channel 104. The third orifice 106 may be located at a second end or a second side of the first channel 104.

The first channel 104 may be a recess positioned on the first surface 111. The first channel 104 may be adapted to place the first orifice 105 and the third orifice 106 in fluid communication with one another. The first surface 111 may be angled to place the first orifice 105 at a lower point than the third orifice 106. Such an arrangement may allow gravity to move fluid through the first channel 104 from the third orifice 106 to the first orifice 105.

The fifth orifice 108 may be located within a second channel 107 positioned on the first surface 111. At least a portion of the perimeter of the fifth orifice 108 may be within the recess of the second channel 107. The fifth orifice 108 may be located at a first end 109 or a first side of the second channel 107.

The second channel 107 may be a recess positioned on the first surface 111. The second channel 107 may be adapted to place the fifth orifice 108 in fluid communication with a second end 110 of the second channel 107. The first surface 111 may be angled to place the second end 110 at a lower point than the fifth orifice 108. Such an arrangement may allow gravity to move fluid through the second channel 107 from the fifth orifice 108 to the second end 110.

The seventh orifice 115 may have threads located on walls defining the orifice. The threads may be adapted capture to a threaded insert, which may be a regulator spring adjusting screw.

The ninth orifice 116 may be located near the seventh orifice 115.

A third channel 203 may surround both the seventh orifice 115 and the ninth orifice 116. The third channel 203 may be a continuous loop around both the seventh orifice 115 and the ninth orifice 116. No other orifice may be within the loop formed by the third channel 203. The third channel 203 may be adapted to receive or carry a gasket.

The second orifice 128 may be located in the second surface 112. A first passageway 120 extending through the stem body 103 may connect the first orifice 105 to the second orifice 128 and place these orifices in fluid communication with one another. A portion of the side wall defining the second orifice 128, nearest the second surface 112, may have threads located thereon. The threads may be adapted to capture a threaded end 181 of the fuel filter cap 180. The bottom wall defining the second orifice 128 may be contoured to carry a fuel filter. The first orifice 105 may be located at the center of the bottom wall defining the second orifice 128, and may extend through an entirety of a thickness of the bottom wall defining the second orifice. The side walls and bottom wall defining the second orifice 128 may be a first recess 113. The first recess 113 may be adapted to carry a fuel filter.

The fourth orifice 129 may be located in the second surface 112 and in fluid communication with the third orifice 106 through a second passageway 121 extending through the stem body 103. The fourth orifice 129 may be adapted to interface with and receive an inlet to a fuel pump. The fourth orifice 129 may be defined by side walls, which extend to a bottom wall. The bottom wall may have an aperture extending through an entirety of a thickness thereof. The diameter of the aperture located in the bottom wall of the fourth orifice may be smaller than the diameter of the fourth orifice 129. The diameter of the third orifice 106 may be equal to the diameter of the aperture located in the bottom wall.

The sixth orifice 130 may be located in the second surface 112. The sixth orifice 130 may be in fluid communication with the fifth orifice 108 through a third passageway 122. The sixth orifice 130, fifth orifice 108, and third passageway 122 may all have equal diameters.

The eighth orifice 131 may be located in the second surface 112 and may be in fluid communication with the seventh orifice 115 through a fourth passageway 132, which extends through the stem body 103. The eighth orifice 131 may have side walls and a bottom wall. The fourth passageway 132 may form an aperture extending through an entirety of a thickness of the bottom wall. The aperture may be located at the center of the bottom wall and the walls defining the aperture may include threads adapted to receive and mate with a threaded insert. The diameter of the aperture may be less than the diameter of the eighth orifice 131 and equal to a diameter of the seventh orifice. The eighth orifice 131 may be adapted to receive a regulator and be in direct fluid communication with an outlet of the regulator. The threaded insert carried by the fourth passageway 132 may engage the regulator.

The tenth orifice 133 may be located on the second surface 112, and more specifically, on the bottom wall of the eighth orifice 131. The tenth orifice 133 may be in fluid communication with the ninth orifice 116 through a fifth passageway 134, which extends through the stem body 103. The tenth orifice 133 may be located off center of the bottom wall and positioned to allow access to a regulator spring adjusting screw located on a regulator carried within the eight orifice 131.

The eleventh orifice 117 may be located on the second surface 112.

The thirteenth orifice 124 may be located in a side wall defining the second orifice 128. The thirteenth orifice 124 may extend through an entirety of a thickness of a side wall defining the second orifice 128.

The fourteenth orifice 126 may be located in the second surface 112. The fourteenth orifice 126 may be in fluid communication with the thirteenth orifice 124 through a seventh passageway 127. A portion of the seventh passageway 127 may extend into the stem body vertically, or orthogonally, from the fourteenth orifice 127 to the thirteenth orifice 124. A portion of the seventh passageway 127 may also extend horizontally from the fourteenth orifice 127 to the thirteenth orifice 124. The vertical portion may be orthogonal to the horizontal portion.

The twelfth orifice 118 may be located on a front surface 119 of the stem body 103. The twelfth orifice 118 may be in fluid communication with the eleventh orifice 117 through a sixth passageway 123, which extends through the stem body. A portion of the sixth passageway 123 may extend into the stem body vertically, or orthogonally, from the eleventh orifice 117 to the twelfth orifice 118. A portion of the sixth passageway 123 may also extend horizontally from the eleventh orifice 117 to the twelfth orifice 118. The vertical portion may be orthogonal to the horizontal portion.

The system for housing a fuel pump and a fuel filter may include a hat 140. The hat 140 may be adapted to secure to the first surface 111 using a plurality of fasteners. There may be one or more orifices 149 located in the hat 140 and adapted to capture a threaded fastener, such as, by way of example and not as a limitation, a screw, or the like. These fasteners may be positioned to align with threaded orifices 136 located on the first surface 111 of the stem body 103. The threaded orifices 136 on the stem body 103 may mate with the threads on the fasteners carried by the hat 140 and secure the hat 140 to the stem body 103.

In addition to orifices adapted for fasteners 149, the hat 140 may contain other orifices. The hat 140 may have a first threaded hat orifice 141. The first threaded hat orifice 141 may extend through an entirety of a thickness of the hat 140 from a top surface 145 to a bottom surface 146. At the location where the first threaded hat orifice 141 is located on the bottom surface 146, it may be positioned to align with the second end 110 of the second channel 107 when the hat 140 is secured to the stem body 103. The first threaded hat orifice 141 may have threads disposed on a side wall defining the orifice. The threads may be positioned near the top surface 145 and may not extend down the entirety of the side wall to the bottom surface 146. The first threaded hat orifice 141 may have a bottom wall with an aperture located through an entirety of the thickness thereof. The first threaded hat orifice 141 may be adapted to receive and carry a fitting adapted to place pressurized fuel exiting the system for housing a fuel pump and a fuel filter 100 in fluid communication with an engine. This may provide a path for pressurized fuel to leave the system 100 and be used by an engine. Pressurized fuel may flow from the fifth orifice 108 in the stem body 103, through the second channel 107 to the second end of the channel 110, through the first threaded hat orifice 141, and exit the system 100 through a fitting carried by the first threaded hat orifice 141, it will then be carried to an engine for consumption.

The hat 140 may have a second hat orifice 142. The second hat orifice 142 may be located within a hat recess 147 located on the top surface 145 of the hat. The second hat orifice 142 may extend through an entirety of a thickness of the hat 140 from a top surface 145 to a bottom surface 146. At the location where the second hat orifice 142 is located on the bottom surface 146, it may be positioned to align with the seventh orifice 115 of the stem body 103 when the hat 140 is secured to the stem body 103. The second hat orifice 142 may be adapted to receive a threaded insert carried by the seventh orifice 115.

The hat 140 may have a protrusion 144 located on a periphery thereof. The protrusion 144 may be used to orient the system 100 within an engine compartment. This orientation may occur by visual alignment of the protrusion 144 with one or more components within the engine compartment or may provide a physical alignment, preventing the system 100 from being oriented in another position.

The hat 140 may have a third hat orifice 143. The third hat orifice 143 may be located within the hat recess 147 along with the second hat orifice 142. The third hat orifice 143 may extend through an entirety of a thickness of the hat 140 from a top surface 145 to a bottom surface 146. At the location where the third hat orifice 143 is located on the bottom surface 146, it may be positioned to align with the ninth orifice 117 of the stem body 103 when the hat 140 is secured to the stem body 103.

The hat 140 may have a fourth hat orifice 148. The fourth hat orifice 143 may be located on a portion of the hat 140 extending beyond an outer periphery of the stem body 103. The fourth hat orifice 148 may extend through an entirety of a thickness of the hat 140 from a top surface 145 to a bottom surface 146. The fourth hat orifice 143 may be adapted to receive one or more electrical wires and provide a passageway for the one or more electrical wires from a bottom surface 146 of the hat 140 to the top surface 145 of the hat 140. The one or more electrical wires may be potted in a fuel-proof epoxy to avoid leaks and rubbing of the one or more wires against any metal surfaces.

Figure 10:
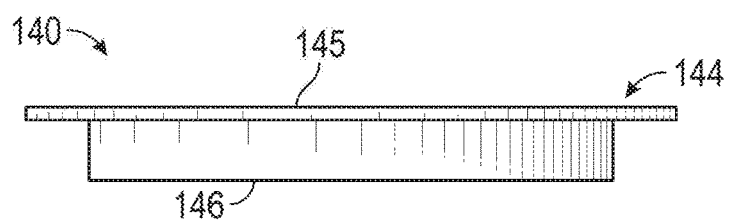
FIG. 10 is a side elevation view of the hat of FIG. 8.
Figure 11:
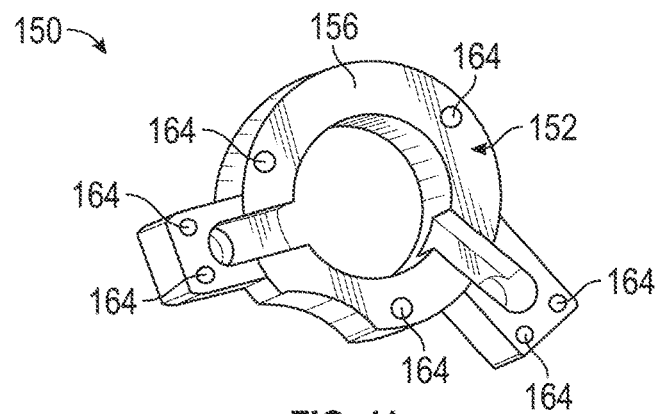
FIG. 11 is a top perspective view of a regulator collar for a system for housing a fuel pump and a fuel filter according to an embodiment of the present invention.
Figure 12:
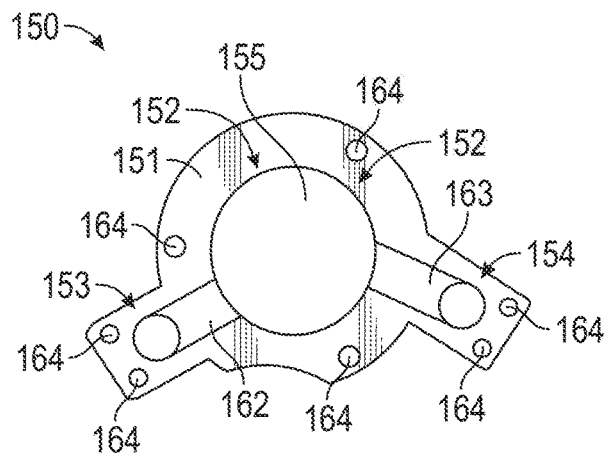
FIG. 12 is a top plan view of the regulator collar of FIG. 11.
Figure 13:
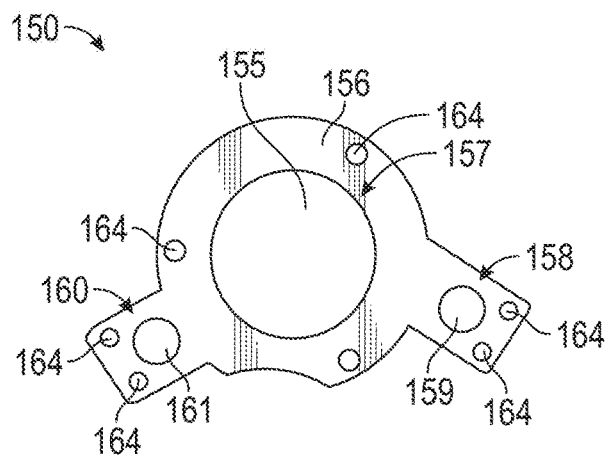
FIG. 13 is a bottom plan view of the regulator collar of FIG. 11.
Figure 14:
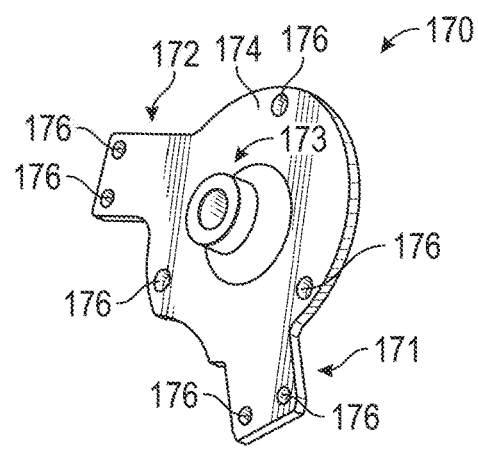
FIG. 14 is a perspective view of a regulator bottom cap for a system for housing a fuel pump and a fuel filter according to an embodiment of the present invention.
Figure 15:
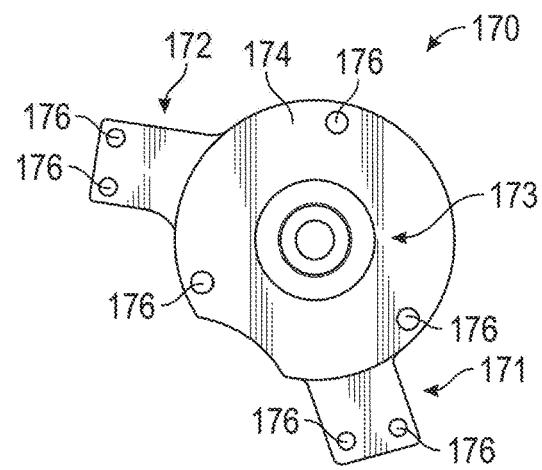
FIG. 15 is a top plan view of the regulator bottom cap of FIG. 14.
Figure 16:
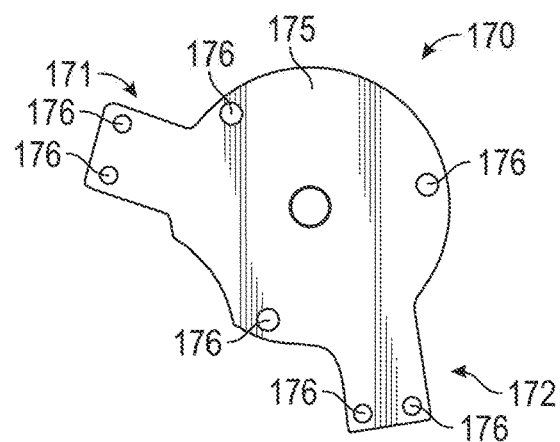
FIG. 16 is a bottom plan view of the regulator bottom cap of FIG. 14.
Figure 17:
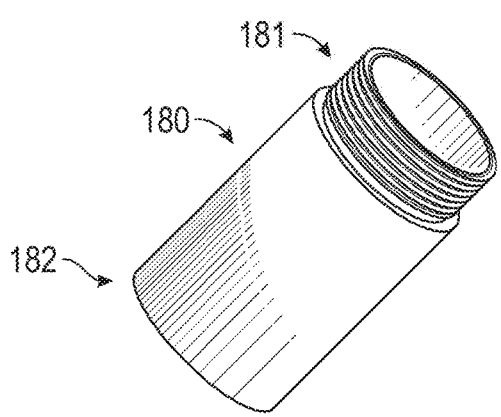
FIG. 17 is a perspective view of a fuel filter cap for a system for housing a fuel pump and a fuel filter according to an embodiment of the present invention.
Figure 18:
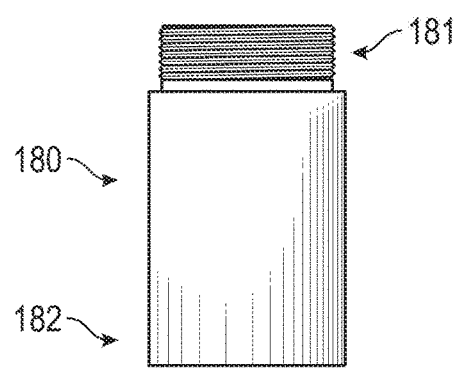
FIG. 18 is a side elevation view of the fuel filter cap of FIG. 17.
Figure 19:
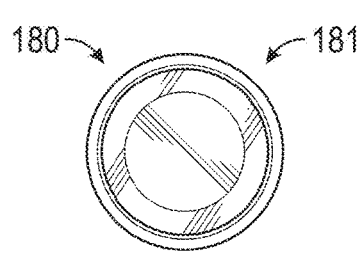
FIG. 19 is a top plan view of the fuel filter cap of FIG. 17.
Figure 20:
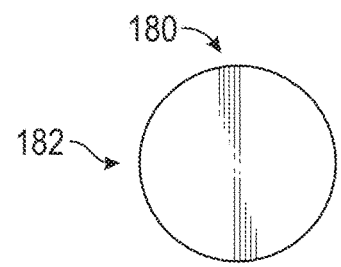
FIG. 20 is a bottom plan view of the fuel filter cap of FIG. 17.
Figure 21:
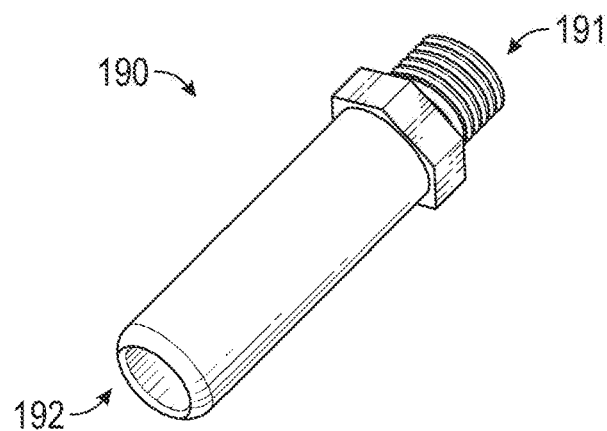
FIG. 21 is a perspective view of a saddle drop nipple for a system for housing a fuel pump and a fuel filter according to an embodiment of the present invention.
Figure 22:
FIG. 22 is a bottom plan view of the saddle drop nipple of FIG. 21.
Figure 23:
FIG. 23 is a side elevation view of the saddle drop nipple of FIG. 21.
Figure 24:
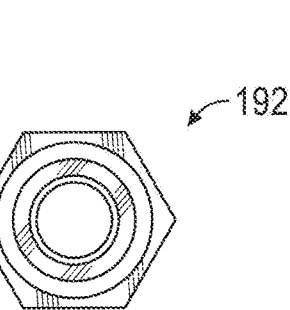
FIG. 24 is a top plan view of the saddle drop nipple of FIG. 21.
Figure 25:
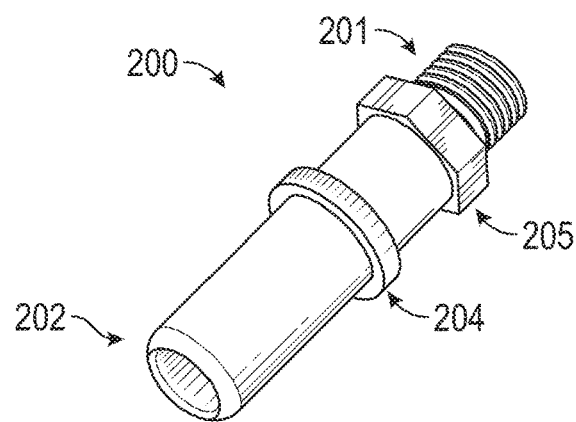
FIG. 25 is a perspective view of a saddle syphon nipple for a system for housing a fuel pump and a fuel filter according to an embodiment of the present invention.
Figure 26:
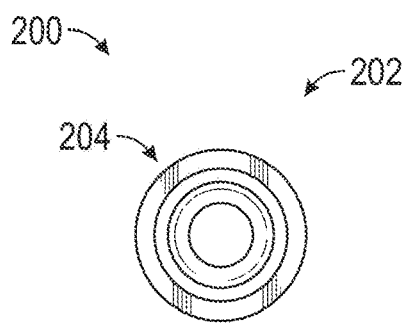
FIG. 26 is a bottom plan view of the saddle syphon nipple of FIG. 25.
Figure 27:
FIG. 27 is a top plan view of the saddle syphon nipple of FIG. 25.
Figure 28:
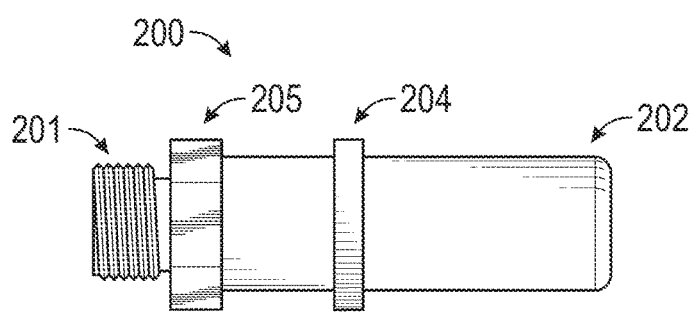
FIG. 28 is a side elevation view of the saddle syphon nipple of FIG. 25.
Figure 29:
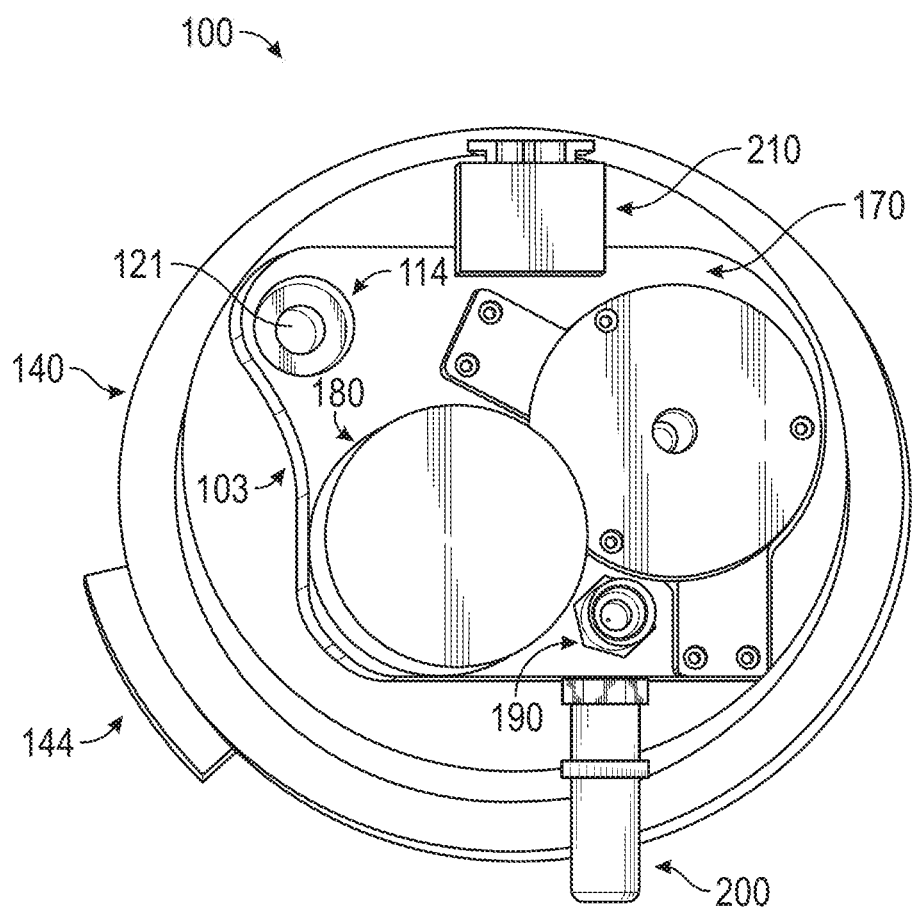
FIG. 29 is a bottom plan view of the system for housing a fuel pump and a fuel filter of FIG. 7.
Figure 30:
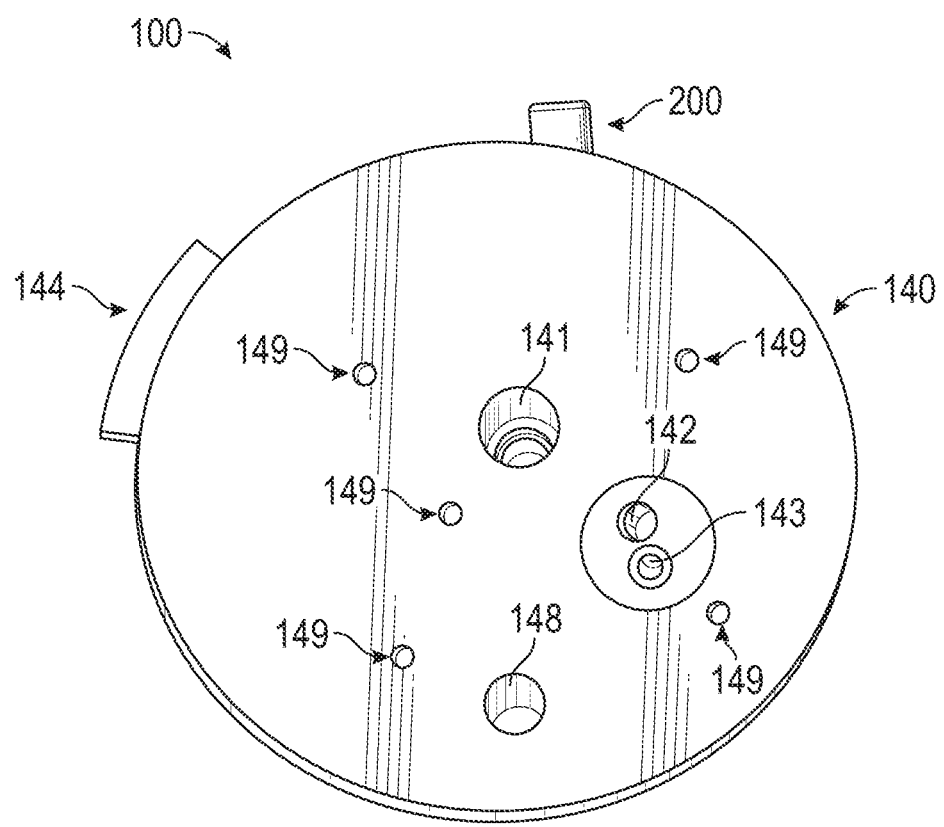
FIG. 30 is a top plan view of the system for housing a fuel pump and a fuel filter of FIG. 7.
Figure 31:
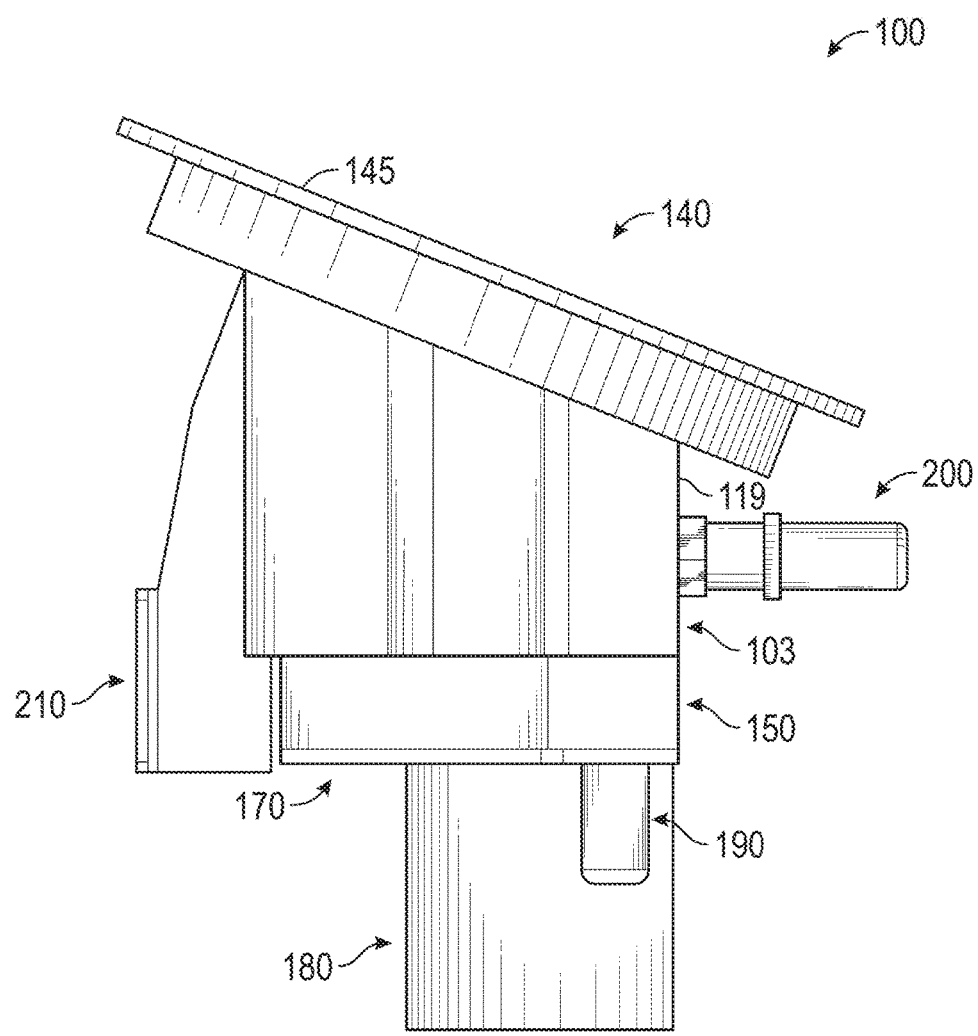
FIG. 31 is a first side elevation view of the system for housing a fuel pump and a fuel filter of FIG. 7.
Figure 32:
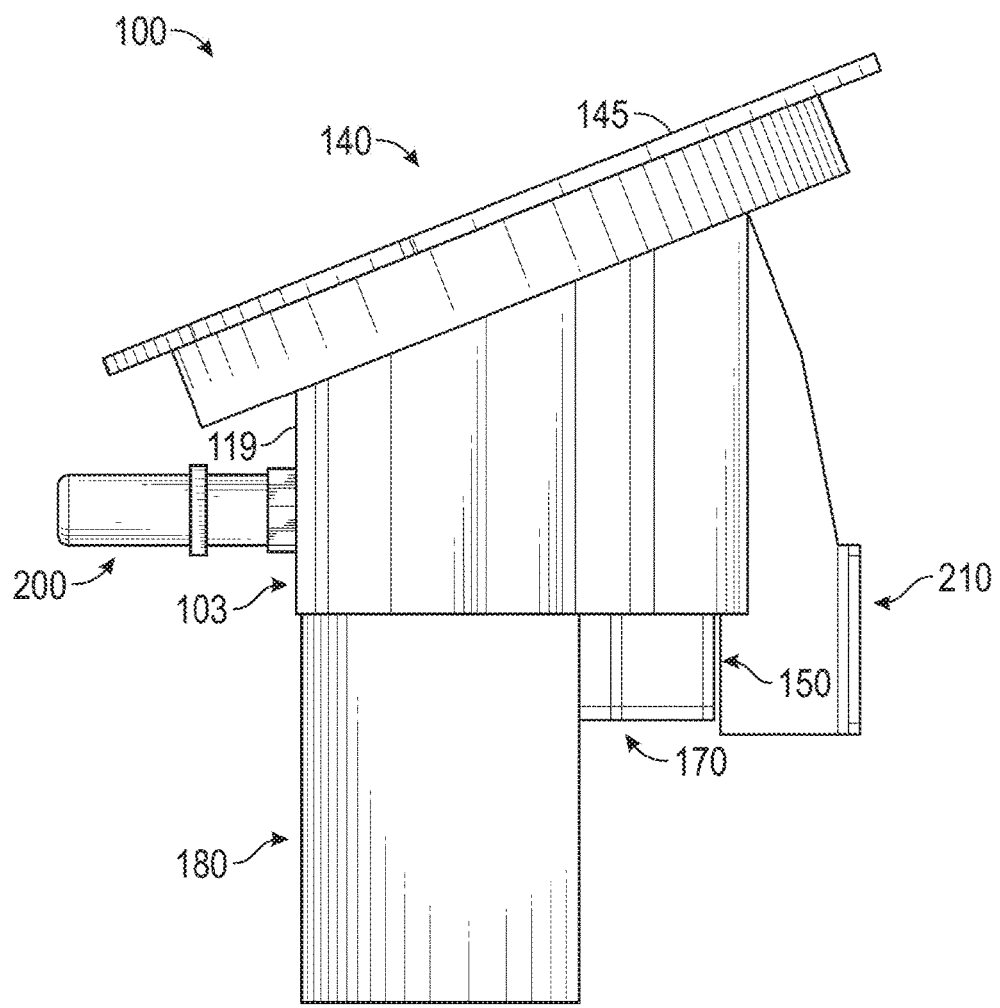
FIG. 32 is a second side elevation view of the system for housing a fuel pump and a fuel filter of FIG. 7.
Figure 33:
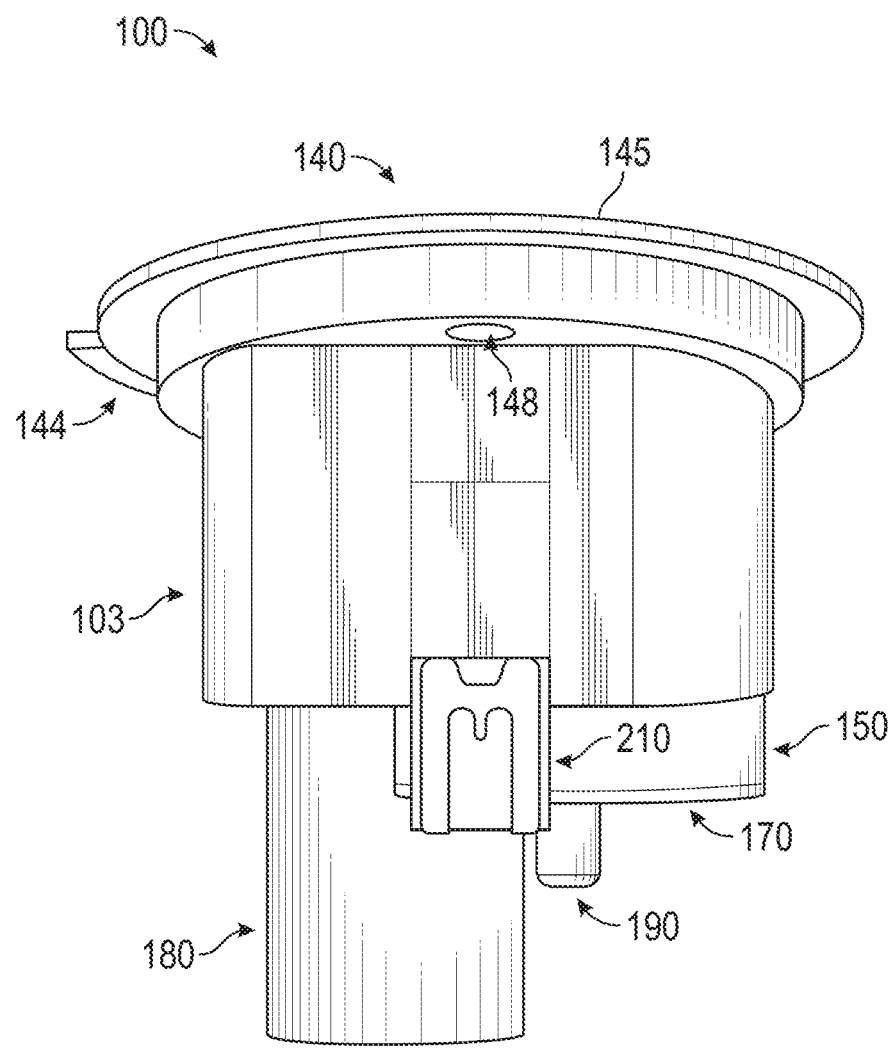
FIG. 33 is a rear elevation view of the system for housing a fuel pump and a fuel filter of FIG. 7.
Figure 34:
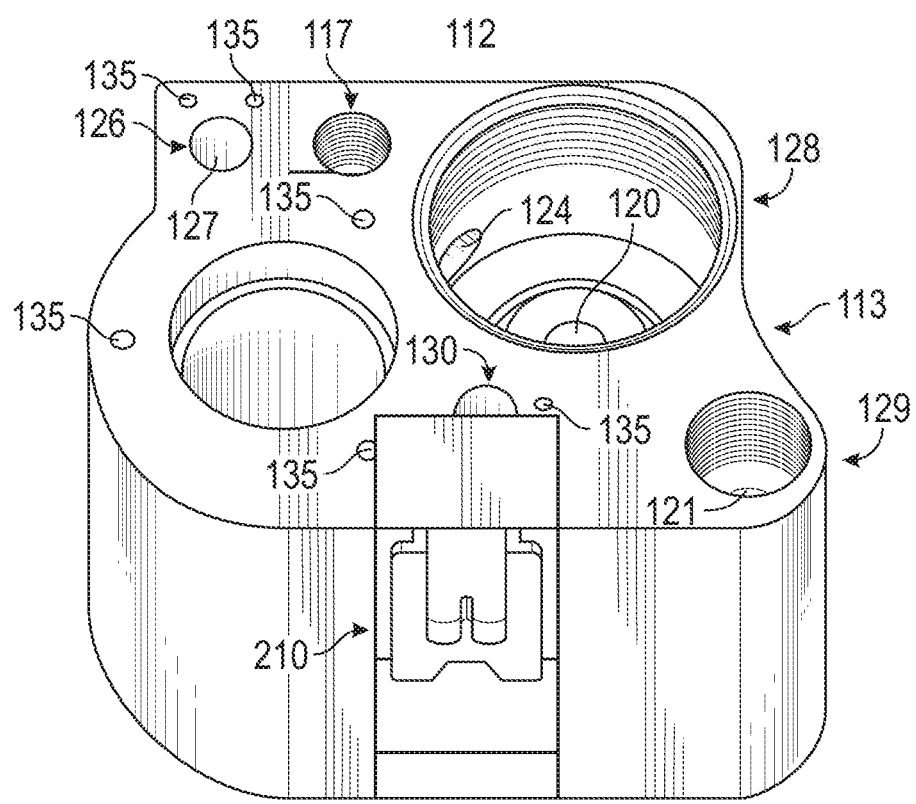
FIG. 34 is a bottom perspective view of the stem body of FIG. 1.

The top surface 145 of the hat may have a diameter or outer periphery larger than that of the bottom surface 146. This may be seen most easily in FIG. 10.

They system 100 may include a regulator collar 150. The regulator collar 150 may have a first side 151 and an opposing second side 156. The regulator collar 150 may be adapted to secure to the second surface 112 of the stem body 103. One or more orifices 164 may be located in the regulator collar 150 and positioned to align with one or more threaded orifices 135 in the second surface 112 of the stem body 103. The threaded orifices 135 in the second surface 112 of the stem body 103 may be adapted to mate with threads located on threaded inserts received by the mating orifices 164 located in the regulator collar 150 and passing through an entirety of a thickness thereof. When the regulator collar 150 is secured to the stem body 103, the second side 156 of the regulator collar 150 may be directly adjacent the second surface 112 of the stem body 103.

The regulator collar 150 may have a first collar orifice 152 located on a first side 151 and passing through an entirety of the thickness of the regulator collar 150 to a second collar orifice 157 located on the second side 156. The first collar orifice 152 may be in fluid communication with the second collar orifice 157 through a first collar passageway 155 having a diameter or outer perimeter equal to that of the first collar orifice 152 and the second collar orifice 157.

The second collar orifice 157 may be adapted to carry a regulator, which may be secured between the second collar orifice 157 and the eighth orifice 131 of the stem body 103 when the regulator collar 150 is secured to the stem body 103. The regulator may have flanges around a periphery which are secured between the second surface 112 of the stem body 103 and the second side 156 of the regulator collar. A body of the regulator may extend into both the second collar orifice 157 and the eighth orifice 131 of the stem body 103. The second collar orifice 157 may be positioned to align with the eighth orifice 131 of the stem body 103 when the regulator collar 150 is secured to the stem body 103.

The regulator collar 150 may have a third collar orifice 153 located on the first side 151 and passing through an entirety of the thickness of the regulator collar 150 to a fourth collar orifice 158 located on the second side 156. The third collar orifice 153 may be in fluid communication with the fourth collar orifice 158 through a second collar passageway 159 having a diameter or outer perimeter equal to that of the third collar orifice 153 and the fourth collar orifice 158.

The fourth collar orifice 158 may be positioned to align with the sixth orifice 130 of the stem body 103 when the regulator collar 150 is secured to the stem body 103.

The regulator collar 150 may have a fifth collar orifice 155 located on the first side 151 and passing through an entirety of the thickness of the regulator collar 150 to a sixth collar orifice 160 located on the second side 156. The fifth collar orifice 155 may be in fluid communication with the sixth collar orifice 160 through a third collar passageway 161 having a diameter or outer perimeter equal to that of the fifth collar orifice 155 and the sixth collar orifice 160.

The sixth collar orifice 160 may be positioned to align with the fourteenth orifice 126 of the stem body 103 when the regulator collar 150 is secured to the stem body 103.

A first collar channel 162 may be located in a first side 151 of the regulator collar 150. The first collar channel 162 may be a recess from an outer wall defining the first collar passageway 155 or first collar orifice 152 to the third collar orifice 153. The first collar channel 162 may surround an entirety of the third collar orifice 153. The third collar orifice 153 may be positioned at an end of the first collar channel 162. The first collar channel 162 may place the first collar orifice 152 in fluid communication with the third collar orifice 153.

A second collar channel 163 may be located in the first side 151 of the regulator collar 150. The second collar channel 163 may be a recess from an outer wall defining the first collar passageway 155 or first collar orifice 152 to the fifth collar orifice 154. The second collar channel 163 may surround an entirety of the fifth collar orifice 154. The fifth collar orifice 154 may be positioned at an end of the second collar channel 163. The second collar channel 163 may place the first collar orifice 152 in fluid communication with the fifth collar orifice 154.

The system may include a regulator bottom cap 170. The regulator bottom cap 170 may have a first side 174 and an opposing second side 175. The regulator bottom cap 170 may be adapted to secure to the regulator collar 150 with the first side of the regulator bottom cap 170 in direct contact with the second side of the regulator collar 150. The regulator bottom cap 170 may have at least one mounting orifice 176. The at least one mounting orifice 176 may extend through an entirety of a thickness of the regulator bottom cap 170 from the first side 175 to the second side 175. The at least one mounting orifice 176 may be adapted to receive and carry a connector. By way of example, and not as a limitation, the connector may be a screw, or the like.

Each of the at least one mounting orifices 176 on the regulator bottom cap 170 may be positioned to align with a corresponding orifice 164 on the regulator collar 150 and a corresponding threaded orifice 135 on the second side 112 of the stem body 103.

The projected perimeter of the regulator bottom cap 170 may be substantially identical to the projected perimeter of the regulator collar 150. A first cover 171 of the regulator bottom cap 170 may extend away from a center of the regulator bottom cap 170 and be adapted cover an entirety of the third collar orifice 153 and the first collar channel 162. A second cover 172 of the regulator bottom cap 170 may extend away from a center of the regulator bottom cap 170 and be adapted cover an entirety of the fifth collar orifice 154 and the second collar channel 163. A protuberance 173 may be located the first side 174 of the regulator bottom cap 170. The protuberance 173 may extend away from a flat portion of the first side 174 toward the stem body 103. The protuberance 173 may be adapted to be received by the first collar orifice 152 and may be in direct contact with a regulator carried by the regulator collar 150. The protuberance 173 may have an orifice defining the center of the protuberance 173.

The system 100 may include a fuel filter cap 180 with a threaded end 181 and an opposing closed end 182. The fuel filter cap 180 may be an elongate, hollow member. The threaded end 181 may be open and adapted to mate with threads located on a side wall defining the second orifice 128 of the stem body 103. The fuel filter cap 180 may be adapted to carry a fuel filter.

The system 100 may include a saddle drop nipple 190 with a threaded end 191 and an opposing open end 192. The saddle drop nipple 190 may be an elongate, hollow member, open on both ends. The threaded end 191 may be open and adapted to mate with threads located on a side wall defining the eleventh orifice 117 of the stem body 103. The saddle drop nipple 190 may be adapted to deliver fuel siphoned from the saddle tank to the main fuel tank. The saddle drop nipple 190 may extend away from the system 100 and adapted to interface with a main fuel tank. The saddle drop nipple 190 may have a polygonal structure located around an outer perimeter or circumference thereof. The polygonal structure may be adapted to be received by a tool, which may apply torque to the saddle drop nipple 190 to remove or insert it from or into the eleventh orifice 117.

The system 100 may include a saddle syphon nipple 200 having a threaded end 201 and an opposing open end 202. The saddle syphon nipple 200 may be an elongate, hollow member, open on both ends. The threaded end 201 may be open and adapted to mate with threads located on a side wall defining the twelfth orifice 118 of the stem body 103. The saddle syphon nipple 200 may be adapted to syphon fuel from the saddle tank, so that it may be delivered to the main fuel tank. The saddle syphon nipple 200 may extend away from the system 100 and be adapted to interface with a saddle fuel tank. The saddle syphon nipple 200 may have a polygonal structure 205 located around an outer perimeter or circumference thereof. The polygonal structure 205 may be adapted to be received by a tool, which may apply torque to the saddle syphon nipple 200 to remove or insert it from or into the twelfth orifice 118. Additionally, the saddle syphon nipple 200 may have a flange 204 located around an outer perimeter or circumference thereof. The flange 204 may be located between the polygonal structure 205 and the open end 202. The flange 204 may be adapted to interface with the saddle fuel tank.

The system 100 may include a mounting portion 210. The mounting portion 210 may be secured to a back surface 211 of the stem body 103. The mounting portion 210 may be adapted to secure to a corresponding original equipment manufacturer style clip in the engine win which the system 100 is installed. The mounting portion 210 may be adapted to allow for a factory fuel level sending unit to be properly located and mounted to the system 100 so that proper fuel level can be maintained in the vehicle carrying the engine.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A system for housing a fuel pump and a fuel filter comprising:
    a stem body having a first surface and an opposing second surface and comprising:
        a first orifice located in the first surface,
        a second orifice located in the second surface, adapted to carry the fuel filter, and in fluid communication with the first orifice through a first passageway, which extends through the stem body,
        a third orifice located in the first surface,
        a fourth orifice located in the second surface, adapted to interface with an inlet to the fuel pump, and in fluid communication with the third orifice through a second passageway, which extends through the stem body,
        a first channel positioned on the first surface and adapted to place the first orifice in fluid communication with the third orifice,
        a fifth orifice located in the first surface,
        a sixth orifice located in the second surface and in fluid communication with the fifth orifice through a third passageway, which extends through the stem body, and
        a second channel positioned on the first surface and adapted to place the fifth orifice, located at a first end of the second channel, in fluid communication with a second end of the second channel.

2. The system according to claim 1 wherein the stem body further comprises:
    a bottom wall of the second orifice adapted to carry the fuel filter; and
    a bottom wall of the fourth orifice adapted to receive an inlet to the fuel pump.

3. The system according to claim 1 wherein the stem body further comprises:
    a seventh orifice located in the first surface,
    an eighth orifice located in the second surface and connected to the seventh orifice through a fourth passageway, which extends through the stem body;
    a ninth orifice located in the first surface,
    a tenth orifice located in the second surface and connected to the ninth orifice through a fifth passageway, which extends through the stem body;
    wherein the eighth orifice is adapted to be in fluid communication with a regulator outlet; and
    wherein the tenth orifice is adapted to provide access to a regulator spring adjusting screw.

4. The system according to claim 3 wherein the stem body further comprises:
    an eleventh orifice located in the second surface; and
    a twelfth orifice located in a front surface of the stem body in fluid communication with the eleventh orifice through a sixth passageway, which extends through the stem body.

5. The system according to claim 4 wherein the stem body further comprises:
    a thirteenth orifice located within a wall defining the second orifice, and
    a fourteenth orifice located in the second surface of the stem body in fluid communication with the thirteenth orifice through a seventh passageway, which extends through the stem body.

6. The system according to claim 3 further comprising:
    a hat adapted to be secured to the first surface and further comprising:
        a first threaded hat orifice adapted to align with the second end of the second channel, and
        a second hat orifice adapted to align with the seventh orifice of the stem body.

7. The system according to claim 6 wherein the hat further comprises a protrusion located on a periphery.

8. The system according to claim 6 wherein the hat further comprises a third hat orifice adapted to align with the ninth orifice of the stem body.

9. The system according to claim 5 further comprising:
    a regulator collar having a first side, an opposing second side, and adapted to secure to the second surface of the stem body and comprising:
        a first collar orifice located on the first side of the regulator collar,
        a second collar orifice located on the second side of the regulator collar and connected to the first collar orifice by a first collar passageway adapted to carry a regulator and centered on the eighth orifice of the stem body, a third collar orifice located on the first side of the regulator collar, a fourth collar orifice located on the second side of the regulator collar, connected to the third collar orifice by a second collar passageway, and adapted to align with the sixth orifice of the stem body, a fifth collar orifice located on the first side of the regulator collar, and a sixth collar orifice located on the second side of the regulator collar, connected to the fifth collar orifice by a third collar passageway, and adapted to align with the fourteenth orifice of the stem body.

10. The system according to claim 9 wherein the regulator collar further comprises:

a first collar channel located on the first side of the regulator and extending from the first collar orifice to the third collar orifice; and a second collar channel located on the first side of the regulator and extending from the first collar orifice to the fifth collar orifice.

11. The system according to claim 10 further comprising:
a regulator bottom cap adapted to secure to the second side of the regulator collar.

12. The system according to claim 11 wherein the regulator bottom cap comprises:

a first cover adapted to cover an entirety of the third collar orifice and the first collar channel;

a second cover adapted to cover an entirety of the fifth collar orifice and the second collar channel; and a protuberance adapted to enter the first collar orifice.

13. The system according to claim 1 further comprising:
a fuel filter cap having a threaded end adapted to mate with threads located on a wall defining the second orifice of the stem body.

14. The system according to claim 13 wherein the fuel filter cap has a closed end opposing the threaded end and is adapted to carry a fuel filter.

15. The system according to claim 4 further comprising a saddle drop nipple having a threaded end adapted to mate with threads located on a wall defining the eleventh orifice of the stem body and an opposing open end adapted to deliver excess fuel to a saddle tank.

16. The system according to claim 4 further comprising a saddle siphon nipple having a threaded end adapted to mate with threads located on a wall defining the twelfth orifice of the stem body and an opposing open end adapted to receive fuel from a saddle tank.

17. A system for housing a fuel pump and a fuel filter comprising:

a first orifice located in a first surface, a second orifice located in a second surface, which opposes the first surface, and in fluid communication with the first orifice through a first passageway, which extends through the stem body, wherein the second orifice is adapted to carry the fuel filter, a third orifice located in the first surface, a fourth orifice located in the second surface and in fluid communication with the third orifice through a second passageway, which extends through the stem body, wherein the fourth orifice is adapted to receive an inlet to the fuel pump, a fifth orifice located in the first surface, a sixth orifice located in the second surface and in fluid communication with the fifth orifice through a third passageway, which extends through the stem body, a seventh orifice located in the first surface, an eighth orifice located in the second surface and connected to the seventh orifice through a fourth passageway, which extends through the stem body, a ninth orifice located in the first surface, a tenth orifice located in the second surface and connected to the ninth orifice through a fifth passageway, which extends through the stem body, an eleventh orifice located in the second surface, a twelfth orifice located in a front surface of the stem body in fluid communication with the eleventh orifice through a sixth passageway, which extends through the stem body, a thirteenth orifice located within a wall defining the second orifice, a fourteenth orifice located in the second surface of the stem body in fluid communication with the thirteenth orifice through a seventh passageway, which extends through the stem body;

a first channel positioned on the first surface and adapted to place the first orifice in fluid communication with the third orifice, and a second channel positioned on the first surface and adapted to place the fifth orifice, located at a first end of the second channel, in fluid communication with a second end of the second channel;

wherein the eighth orifice is adapted to be in fluid communication with a regulator outlet; and wherein the tenth orifice is adapted to provide access to a regulator spring adjusting screw.

18. A system for housing a fuel pump and a fuel filter comprising:

a stem body having a first surface and an opposing second surface, further comprising:

a first orifice located in the first surface, a second orifice located in the second surface and in fluid communication with the first orifice through a first passageway, which extends through the stem body, having a bottom wall adapted to carry the fuel filter a third orifice located in the first surface, a fourth orifice located in the second surface and in fluid communication with the third orifice through a second passageway, which extends through the stem body, having a bottom wall adapted to receive an inlet to the fuel pump, a fifth orifice located in the first surface, a sixth orifice located in the second surface and in fluid communication with the fifth orifice through a third passageway, which extends through the stem body, a seventh orifice located in the first surface, an eighth orifice located in the second surface and connected to the seventh orifice through a fourth passageway, which extends through the stem body, a ninth orifice located in the first surface, a tenth orifice located in the second surface and connected to the ninth orifice through a fifth passageway, which extends through the stem body, an eleventh orifice located in the second surface, a twelfth orifice located in a front surface of the stem body in fluid communication with the eleventh orifice through a sixth passageway, which extends through the stem body, a thirteenth orifice located within a wall defining the second orifice, a fourteenth orifice located in the second surface of the stem body in fluid communication with the thirteenth orifice through a seventh passageway, which extends through the stem body;
a first channel positioned on the first surface and adapted to place the first orifice in fluid communication with the third orifice,
a second channel positioned on the first surface and adapted to place the fifth orifice, located at a first end of the second channel, in fluid communication with a second end of the second channel;
a hat adapted to be secured to the first surface and further comprising:
a first threaded hat orifice adapted to align with the second end of the second channel,
a second hat orifice adapted to align with the seventh orifice of the stem body,
a third hat orifice adapted to align with the ninth orifice of the stem body, and
a protrusion located on a periphery of the hat and adapted to orient the hat within an engine compartment;
a regulator collar having a first side, an opposing second side, adapted to secure to the second side of the stem body, and further comprising:
a first collar orifice located on the first side of the regulator collar,
a second collar orifice located on the second side of the regulator collar and connected to the first collar orifice by a first collar passageway adapted to carry a regulator and centered on the eighth orifice of the stem body,
a third collar orifice located on the first side of the regulator collar,
a fourth collar orifice located on the second side of the regulator collar, connected to the third collar orifice by a second collar passageway, and adapted to align with the sixth orifice of the stem body,
a fifth collar orifice located on the first side of the regulator collar,
a sixth collar orifice located on the second side of the regulator collar, connected to the fifth collar orifice by a third collar passageway, and adapted to align with the fourteenth orifice of the stem body,
a first collar channel located on the first side of the regulator and extending from the first collar orifice to the third collar orifice; and
a second collar channel located on the first side of the regulator and extending from the first collar orifice to the fifth collar orifice;
a regulator bottom cap adapted to secure to the second side of the regulator collar;
a fuel filter cap having a threaded end adapted to mate with threads located on a wall defining the second orifice of the stem body;
a saddle drop nipple having a threaded end adapted to mate with threads located on a wall defining the eleventh orifice of the stem body and an opposing open end adapted to deliver excess fuel to a saddle tank; and
a saddle siphon nipple having a threaded end adapted to mate with threads located on a wall defining the twelfth orifice of the stem body and an opposing open end adapted to receive fuel from a saddle tank;
wherein the eighth orifice is adapted to be in fluid communication with a regulator outlet;
wherein the tenth orifice is adapted to provide access to a regulator spring adjusting screw.

19. The system according to claim 18 wherein the regulator bottom cap comprises:
a first cover adapted to cover an entirety of the third collar orifice and the first collar channel;
a second cover adapted to cover an entirety of the fifth collar orifice and the second collar channel; and
a protuberance adapted to enter the first collar orifice.

20. The system according to claim 18 wherein the fuel filter cap has a closed end opposing the threaded end and is adapted to carry a fuel filter.

* * * * *